US010812853B2

(12) United States Patent
Tofighbakhsh et al.

(10) Patent No.: US 10,812,853 B2
(45) Date of Patent: Oct. 20, 2020

(54) USER CLASSIFICATION USING A REMOTE CONTROL DETAIL RECORD

(71) Applicant: AT&T INTELLECTUAL PROPERTY I, L.P., Atlanta, GA (US)

(72) Inventors: Mostafa Tofighbakhsh, Cupertino, CA (US); Bryan Sullivan, Sammamish, WA (US)

(73) Assignee: AT&T INTELLECUTAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/168,174

(22) Filed: Oct. 23, 2018

(65) Prior Publication Data

US 2020/0128288 A1   Apr. 23, 2020

(51) Int. Cl.
*H04N 7/16* (2011.01)
*H04N 21/422* (2011.01)
*H04N 21/433* (2011.01)
*H04N 21/44* (2011.01)

(52) U.S. Cl.
CPC ... *H04N 21/42204* (2013.01); *H04N 21/4334* (2013.01); *H04N 21/44* (2013.01)

(58) Field of Classification Search
CPC ......... H04N 21/42201; H04N 21/4222; H04N 21/4415; H04N 21/4532
See application file for complete search history.

(56) References Cited

U.S. PATENT DOCUMENTS

| | | | |
|---|---|---|---|
| 6,970,098 | B1 | 11/2005 | Adams |
| 7,260,823 | B2 | 8/2007 | Schlack |
| 7,792,815 | B2 | 9/2010 | Aravamudan |
| 8,079,046 | B2 | 12/2011 | Ali |

(Continued)

FOREIGN PATENT DOCUMENTS

| | | |
|---|---|---|
| CN | 104780394 | 5/2018 |
| DE | 4337548 | 8/1995 |

(Continued)

OTHER PUBLICATIONS

NPL Document entitled "Embedding behavior modification strategies into a consumer electronic device: a case study" by Nawyn et al., International Conference on Ubiquitous Computing, Springer, Berlin, Heidelberg, 2006.

(Continued)

*Primary Examiner* — Gigi L Dubasky
(74) *Attorney, Agent, or Firm* — Baker Botts, LLP

(57) ABSTRACT

Methods, systems, and computer programs encoded on computer storage medium, for receiving, by an analytics computing engine, a first remote control detail record (RCDR) of a remote control device that is communicatively coupled to a set-top box, the first RCDR including sensor data from one or more sensors of the remote control device, the RCDR being generated in response to a first video stream provided by the set-top box; processing, by the analytics computing engine, the first RCDR to determine a classification of a user associated with the sensor data, the classification of the user including one or more demographic categories; determining, by the analytics computing engine, a second video stream based on the classification of the user; and communicating, by the analytics computing engine, the second video stream to the set-top box.

18 Claims, 3 Drawing Sheets

(56) References Cited

U.S. PATENT DOCUMENTS

| | | |
|---|---|---|
| 8,171,510 B2 | 5/2012 | Kamen |
| 8,745,206 B1 | 6/2014 | Chang |
| 8,955,002 B2 | 2/2015 | Seiden |
| 9,241,200 B2 | 1/2016 | Chen |
| 9,282,353 B2 | 3/2016 | Davis |
| 9,584,836 B2 | 2/2017 | Fei |
| 9,680,886 B2 | 6/2017 | Arunachalam |
| 9,762,971 B1 | 9/2017 | Dodge |
| 2004/0137416 A1 | 7/2004 | Ma |
| 2010/0042564 A1* | 2/2010 | Harrison .............. G06F 3/01 706/13 |
| 2010/0293566 A1* | 11/2010 | Valdez ............. G06Q 30/02 725/14 |
| 2012/0131098 A1 | 5/2012 | Wood |
| 2014/0047465 A1 | 2/2014 | Zaslavsky |
| 2014/0075463 A1 | 3/2014 | Kamdar |
| 2014/0184922 A1* | 7/2014 | Schafer ........... H04N 21/44222 348/734 |
| 2015/0269177 A1* | 9/2015 | Friedman ........... G06F 16/1734 707/723 |
| 2016/0182950 A1* | 6/2016 | Robinson ........... H04N 21/4532 725/28 |
| 2018/0367831 A1* | 12/2018 | Langille ............. H04N 5/4403 |

FOREIGN PATENT DOCUMENTS

| | | |
|---|---|---|
| EP | 2817970 | 4/2015 |
| TW | 201442504 | 11/2014 |
| WO | WO03053056 | 6/2003 |
| WO | WO2010078650 | 7/2010 |
| WO | WO2016020464 | 9/2016 |

OTHER PUBLICATIONS

NPL Document entitled "Inferring identity using accelerometers in television remote controls" by Keng-hao Chang et al., International Conference on Pervasive Computing. Springer, Berlin, Heidelberg, 2009, 17 pages.

NPL Document entitled "Creating an ambient-intelligence environment using embedded agents" by Hani Hagras et al., IEEE Intelligent Systems 19.6 (2004): 12-20.

* cited by examiner

USER CLASSIFICATION USING A REMOTE CONTROL DETAIL RECORD

TECHNICAL FIELD

The disclosure relates generally to user classification using a remote control detail record.

BACKGROUND

A content distribution system, such as a content distribution system for television programming, provides an expansive array of programs, such as movies, local programs, national programs, sports, news, etc., to users. Additionally, the content distribution system provides users with a variety of advertisements (ads) (e.g., commercials, etc.).

SUMMARY

According to an embodiment, a method includes receiving, by an analytics computing engine, a first remote control detail record (RCDR) of a remote control device that is communicatively coupled to a set-top box, the first RCDR including sensor data from one or more sensors of the remote control device, the RCDR being generated in response to a first video stream provided by the set-top box; processing, by the analytics computing engine, the first RCDR to determine a classification of a user associated with the sensor data, the classification of the user including one or more demographic categories; determining, by the analytics computing engine, a second video stream based on the classification of the user; and communicating, by the analytics computing engine, the second video stream to the set-top box.

According to another embodiment, a non-transitory computer-readable medium storing software comprising instructions executable by one or more computers which, upon such execution, cause the one or more computers to perform operations comprising receiving, by an analytics computing engine, a first RCDR of a remote control device that is communicatively coupled to a set-top box, the first RCDR including sensor data from one or more sensors of the remote control device, the RCDR being generated in response to a first video stream provided by the set-top box; processing, by the analytics computing engine, the first RCDR to determine a classification of a user associated with the sensor data, the classification of the user including one or more demographic categories; determining, by the analytics computing engine, a second video stream based on the classification of the user; and communicating, by the analytics computing engine, the second video stream to the set-top box.

According to yet another embodiment, a system comprising a processor having access to memory media storing instructions executable by the processor to perform operations receiving, by an analytics computing engine, a RCDR of a remote control device that is communicatively coupled to a set-top box, the first RCDR including sensor data from one or more sensors of the remote control device, the RCDR being generated in response to a first video stream provided by the set-top box; processing, by the analytics computing engine, the first RCDR to determine a classification of a user associated with the sensor data, the classification of the user including one or more demographic categories; determining, by the analytics computing engine, a second video stream based on the classification of the user; and communicating, by the analytics computing engine, the second video stream to the set-top box.

Technical advantages of this disclosure may include the following. A technical advantage may include an improvement in the network bandwidth usage by efficiently selecting video streams to provide to set-top boxes. By selecting and providing the most appropriate video streams (e.g., video streams that are most appropriate for a user), the network bandwidth usage is improved, as opposed to selecting and providing multiple less-preferred video streams. Furthermore, technical advantages can include efficiency in computing resource usage by appropriately classifying users of the set-top boxes, thereby enabling selecting of appropriate video streams for the users.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Providing video streams to users that they find enjoyable and are engaged with can improve the experience of the user. When users are engaged with a video stream, users tend to have increased satisfaction with the video stream. However, some users may experience video streams that are not suited for their needs. The video streams can be for a user having different characteristics, and thus, the user loses interest and engagement with the video stream. For example, the user can be an adult male, and the video stream is related to kid's toys. Thus, it is desirable to properly classify a user into appropriate demographic categories such that appropriate video streams are provided to the user. By appropriately classifying the user, and then providing the user with appropriate video streams, the user can remain engaged with the video stream. This disclosure describes a method and system for classifying a user by the interaction of the user with a remote control device that controls a set-top box that provides the videos streams, including obtaining environmental sensor data approximate to the user while the user is using the remote control device. By using such environment sensor data, the user can be classified into demographic groups, and ultimately provide video streams to the user based on such classification of the user.

Specifically, this document describes methods, systems, and computer readable medium for receiving, by an analytics computing engine, a first remote control detail record (RCDR) of a remote control device that is communicatively coupled to a set-top box. The first RCDR includes sensor data from sensors of the remote control device. The RCDR is generated in response to a first video stream provided by the set-top box. The analytics computing engine can process the first RCDR to determine a classification of a user associated with the sensor data. The classification of the user can include demographic categories. The analytics computing engine can determine a second video stream based on the classification of the user, and further communicate the second video stream to the set-top box.

Figure 1:
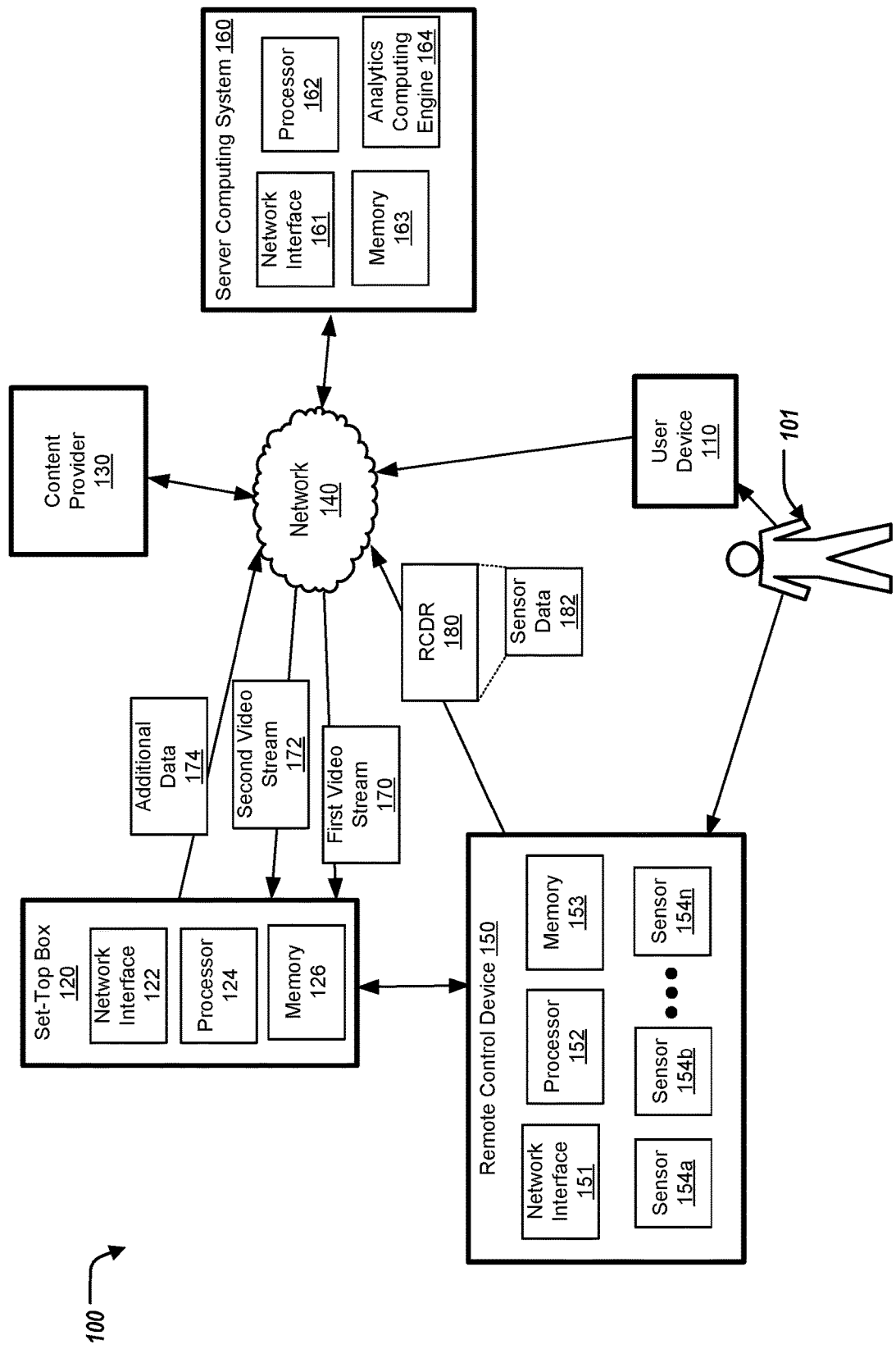
FIG. 1 illustrates a block diagram of an environment for user classification using a remote control detail record.
Figure 2:
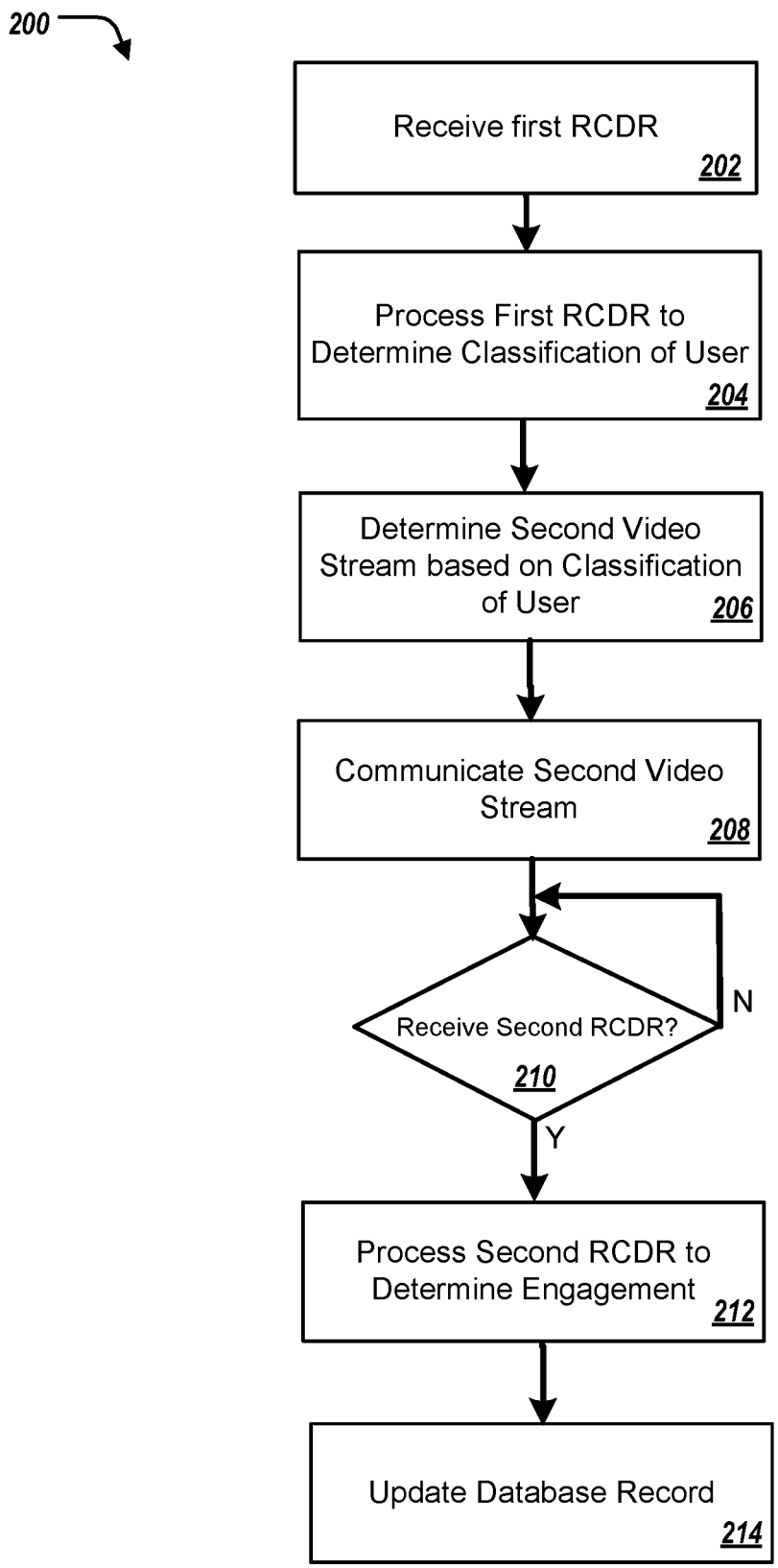
FIG. 2 illustrates a flowchart for user classification using a remote control detail record.
Figure 3:
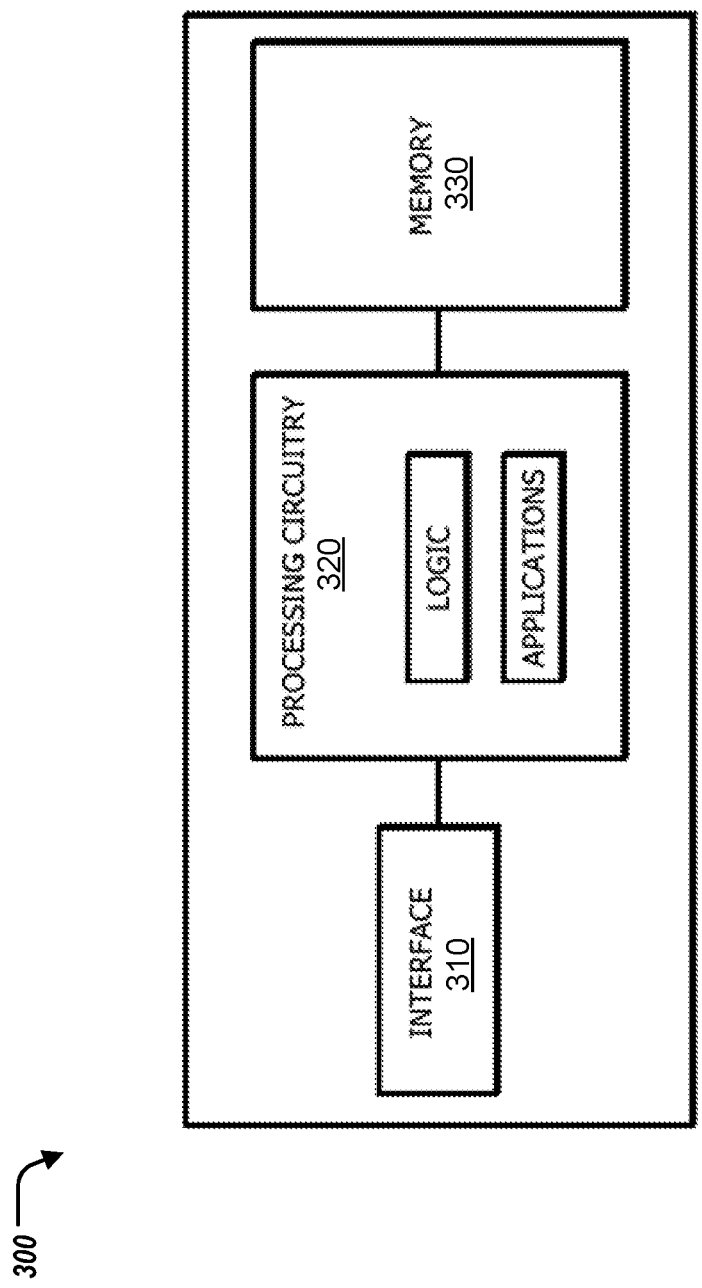
FIG. 3 illustrates an example computing system that may be used to implement the techniques described herein.

FIGS. 1 through 3 show example systems and methods for classification of users using a remote control detail record. FIG. 1 shows a block diagram of an environment of user classification using a remote control detail record. FIG. 2 illustrates a flowchart for user classification using a remote control detail record. FIG. 3 shows an example computer system that may be used by the systems and methods described herein.

FIG. 1 illustrates a block diagram of an environment 100 for user classification using a remote control detail record. Environment 100 includes a user 101, a user device 110, a set-top box (STB) 120, and a content provider 130 connected to each other by a network 140. Although FIG. 1 illustrates a particular arrangement of user 101, user device 110, STB 120, content provider 130, and network 140, this disclosure contemplates any suitable arrangement of user 101, user device 110, STB 120, content provider 130, and network 140. As an example and not by way of limitation, two or more of user devices 110, STB 120, and content provider 130 may be connected to each other directly, bypassing network 140. As another example, two or more of user device 110, STB 120, and content provider 130 may be physically or logically co-located with each other in whole or in part. Moreover, although FIG. 1 illustrates a particular number of users 101, user device 110, STB 120, content provider 130, and networks 140, this disclosure contemplates any suitable number of users 101, user device 110, STB 120, content provider 130, and network 140. As an example and not by way of limitation, network environment 100 may include multiple users 101, user devices 110, STBs 120, content providers 130, and networks 140.

In particular embodiments, user 101 may be an individual (human user), an entity (e.g., an enterprise, business, or third-party application), or a group (e.g., of individuals or entities) that interacts or communicates with STB 120 and/or content provider 130 through user device 110. User 101 may navigate a program guide, select multimedia content to record, and perform other interactive functions for viewing multimedia content using STB 120.

User device 110 may access STB 120 or content provider 130 directly, via network 140, or via a third-party system. As an example and not by way of limitation, user device 110 may access content from content provider 130 via STB 120. In certain embodiments, user 101 must log in and authenticate a user identification and/or password before user device 110 is able to access and communicate with STB 120. User device 110 may be any suitable computing device, such as, for example, a personal computer, a laptop computer, a cellular telephone, a smartphone, a tablet computer, or an augmented/virtual reality device. User device 101 may also include a user interface, such as a keypad, a display, a microphone, or other appropriate terminal equipment for use by user 101. In some embodiments, an application executed by user device 110 may perform the functions described herein. User device 110 may be implemented using any suitable type of processing system and may include any suitable combination of hardware, firmware, and software. Each user device 110 may include any appropriate number of input devices, output devices, mass storage media, processors, memory, or other suitable components for receiving, processing, storing, and communicating data.

STB 120 is generally a device that provides interactive features such that user 101 can access, record, and interact with options providing for multimedia content. In particular embodiments, STB 120 may be a network-addressable computing system that can receive input, generate audio and/or video output for display, and communicate with user device 110. STB 120 may also receive input from content provider 130 and communicate audio and/or video output for display. For example, STB 120 may receive radio frequency analog television input, digital television input, satellite television input, and/or any other suitable type of input that contains a program guide. STB 120 may also receive the program guide from content provider 130.

The program guide may be an application that provides a list of current and scheduled programs that is or will be available on each channel, and, sometimes, a short summary or commentary for each program. Typically, a program guide allows user 101, through an interactive diagram, to access television, radio, and other multimedia content with updated menus displaying broadcast programming or scheduling information for current and upcoming programming. STB 120 may comprise a channel device, an ultra-high frequency (UHF) converter, a cable converter box, a closed captioning box, a digital television adapter, an integrated receiver/decoder, a hybrid box, an Internet Protocol Television (IPTV) receiver, and/or any other suitable device that receives the program guide and live streams multimedia content to user device 110.

Multimedia content consists of television, radio, images, videos, audio, or any other items that may be streamed from one device to another. Multimedia content may be communicated in typical video and/or audio format or may be sent as a compressed form. In certain embodiments, multimedia content is associated with one or more policies. The associated policies may reside on STB 120 or may be communicated from content server 130. Policies may include any suitable rating system or filter that may impact what multimedia content is displayed and to whom the multimedia content is displayed.

For example, policies may include parental guidelines. Parental guidelines represent a television content rating system that typically rates multimedia content based on the subject matter of the content and the suitability for certain audiences. For example, a children's program may receive a parental rating of "TV-Y," indicating that multimedia content is designed for a young audience. As another example, a horror show may receive a parental rating of "TV-14-DLS," indicating that the multimedia content may contain material unsuitable for children under the age of 14. Any suitable rating system may be used for the parental guideline.

In the illustrated embodiment, STB 120 includes network interface 122, processor 124, and memory 126. Network interface 122 facilitates communication between processor 124, network 140, or other components of network environment 100. Network interface 122 may facilitate communication over portions of network 140 or over a separate data network. For example, network interface 122 may live stream one or more multimedia contents to one or more user devices 110. In particular embodiments, network interface 122 includes or represents one or more network interface cards (NICs).

Processor 124 may represent or include any form of processing components, including dedicated microprocessors, general-purpose computers, or other devices capable of processing electronic information. Examples of processor 124 include field-programmable gate arrays (FPGAs), programmable microprocessors, digital signal processors (DSPs), application-specific integrated circuits (ASICs), and any other suitable specific- or general-purpose processors. Although FIG. 1 illustrates, for the sake of simplicity, an embodiment of STB 120 that includes a single processor 124, STB 120 may include any number of processors 124 configured to interoperate in any appropriate manner.

Memory 126 stores processor instructions and/or any other data utilized by STB 120 during operation. Memory 126 may comprise any collection and arrangement of volatile or non-volatile, local or remote devices suitable for storing data, such as random access memory (RAM), read only memory (ROM), magnetic storage, optical storage, or any other suitable type of data storage components. For example, memory 126 may store an authorization policy setting and an authorized user group setting associated with one or more users 101 and/or one or more user devices 110. Although shown as a single element in FIG. 1, memory 126 may include one or more physical components local to or remote from STB 120.

Content provider 130 generally communicates the program guide and multimedia content to STB 120. For example, content provider 130 may communicate multimedia content to STB 120 via network 140. In some embodiments, content provider 130 communicates multimedia content directly to STB 120. In some embodiments, content provider 130 may communicate multimedia content to STB 120 via radio frequency signals transmitted through coaxial cables. Content provider 130 may also communicate the program guide to STB 120. Content provider 130 may communicate the program guide and/or multimedia content via light pulses through fiber-optic cables, over the air radio waves, through network 140 (e.g., through the internet or telephone network), or any other suitable means of transmission.

This disclosure contemplates any suitable network 140. As an example and not by way of limitation, one or more portions of network 140 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a combination of two or more of these, or any suitable type of network. Network 140 may include one or more networks 140.

Environment 100 can further include a remote control device 150 and a server computing system 160. Server computing system 160 may include a network interface 161, a processor 162, and a memory 163, similar to network interface 122, processor 124, and memory 126, respectively, of set-top box 120. Server computing system 160 may further include an analytics computing engine 164. Analytics computing engine 164 may be one or more modules of server computing system 160. Server computing system 160 may be in communication with set-top box 120 and remote control device 150 over network 140.

Remote control device 150 may include a network interface 151, a processor 152, and a memory 153, similar to network interface 122, processor 124, and memory 126, respectively, of set-top box 120. Remote control device 150 may be in communication with set-top box 120 (e.g., via WiFi, Bluetooth, or other communication means). Remote control device 150 can communicate with set-top box 120 to control one or more functions or operations of set-top box 120 (e.g., adjusting a source of a video stream provided by set-top box 120, or changing a volume associated with such video stream).

Remote control device 150 may include sensors 154a, 154b, ..., 154n (collectively referred to as sensors 154). Sensors 154 may collect sensor data. Specifically, sensors 154 may collect sensor data of remote control device 150 and/or user 101 that is interacting with remote control device 150. Sensor data may include such data as: i) keypress selection data (e.g., which buttons of remote control device 150 were pressed, including a sequence they were pressed in); ii) keypress pressure data (e.g., pressure applied to selected buttons of remote control device 150); iii) temperature (e.g., temperature of remote control device 150 when interacted with by user 101, and/or temperature of user 101); iv) frequency of keypresses (e.g., how often buttons of remote control device 150 are selected, over a time period); and v) location data of remote control device 150 relative to set-top box 120 (e.g., where remote control device 150 is located relative to set-top box 120). Sensor data may further include other types of data such as time of day of keypresses.

In some implementations, server computing system 160, and in particular, analytics computing engine 164, receives a first remote control detail record (RCDR) 180 from remote control device 150. In some examples, analytics computing engine 164 receives first RCDR 180 from remote control device 150, e.g., over network 140. In some examples, analytics computing engine 164 receives first RCDR 180 from set-top box 120, e.g., set-top box 120 receives RCDR 180 from remote control device 150 and communicates RCDR 180 to analytics computing engine 164 over network 140.

Specifically, set-top box 120 may receive a first video stream 170 that is presented on a display device (e.g., television or monitor) connected to set-top-box 120 and is perceived by user 101. Once first video stream 170 is established, remote control device 150 may initiate generation of first RCDR 180—that is, initiate collection of sensor data from sensors 154 of remote control device 150. In other words, remote control device 150 generates RCDR 180 in response to first video stream 170 that is provided by set-top box 120.

RCDR 180 may include sensor data 182 that is collected by sensors 154 of remote control device 150, as described above. In some examples, sensor data 182 is responsive to first video stream 170. That is, sensor data 182 is obtained during, or shortly after, presentation of first video stream 170, and may include data based on interactions by user 101 that is responsive to first video stream 170.

In some examples, analytics computing engine 164 may further receive data indicating a set of users associated with set-top box 120 and/or remote control device 150. That is, such data may indicate a set of users that interact with set-top box 120 and/or remote control device 150. Analytics computing engine 164 may receive such data from set-top box 120 in coordination with receiving RCDR 180, or at another time previous to receiving RCDR 180. Analytics computing engine 164 may receive such data from a data store that is communicatively coupled to server computing system 160.

In some examples, analytics computing engine 164 may receive additional data 174 from set-top box 120 that corresponds to first RCDR 180 that is indicative of first video stream 170. For example, additional data 174 may include a geographic location of set-top box 120 (e.g., a state, a city, and/or a neighborhood that set-top box 120 is located in); volume level data of first video stream 170 (e.g., a volume, or a range of volumes, at which first video stream 170 is provided at by set-top box 120); metadata of first video stream 170 (e.g., a channel, program, or video stream identifying data associated with first video stream 170); and user profile data of user 101 that is associated with sensor data 182 (e.g., user identifying information of user 101).

In some examples, RCDR 180 may further include data indicating external events (e.g., external to set-top box 120 and/or remote control device 150). For example, external events may include a time/date of first video stream 170, and events (local and global) that are current such as news feeds and holiday data. RCDR 180 may be injected with pointers to such external events.

In some implementations, server computing system 160, and in particular, analytics computing engine 164, processes first RCDR 180 to determine a classification of user 101 that is associated with sensor data 182. That is, analytics computing engine 164 processes first RCDR 180 to determine a classification of user 101 that is providing, or is the source of, sensor data 182. Specifically, analytics computing engine 164 processes first RCDR 180 to determine one or more demographic categories (classifications) of user 101. In some examples, demographic categories of user 101 may include age and/or gender.

For example, analytics computing engine 164 may process first RCDR 180 and determine that a classification of user 101 is a child. Specifically, analytics computing engine 164 processes first RCDR 180, and specifically, determines that keypress pressure data of sensor data 182 is less than a threshold. In response to determining that keypress pressure data of sensor data 182 of first RCDR 180 is less than a threshold, analytics computing engine 164 may determine that sensor data 182 is indicative of a child, and thus, classify user 101 within a child demographic.

In some examples, analytics computing engine 164 may compare data indicating a set of users with first RCDR 180. For example, analytics computing engine 164 may determine that classification of user 101 is a child based on sensor data 182. Analytics computing engine 164 may receive data indicating that a set of users associated with set-top box 120 and/or remote control device 150 includes Tom Smith (Adult Male), Jane Smith (Adult Female) and Joey Smith (Child). Analytics computing engine 164 may, in response to comparing data indicating a set of users with first RCDR 180, determine a particular user of the set of users that is associated with sensor data 182. For example, analytics computing engine 164 compares a classification of user 101—a child—with a particular set of users to determine that user 101 is Joey Smith.

In some examples, analytics computing engine 164 may process first RCDR 180 and additional data 174 from set-top box 120 to determine a classification of user 101 associated with sensor data 182. Specifically, analytics computing engine 164 may correlate additional data 174 with sensor data 182 to determine a classification of user 101. For example, additional data 174 may include metadata of first video stream 170 indicating a channel that first video stream is provided on through set-top box 120; and sensor data 182 may indicate a keypress pressure data. Specifically, a channel that is indicated by metadata of additional data 174 may be associated with a typical child's program; and keypress pressure data of sensor data 182 may be less than a threshold. To that end, analytics computing engine 164 may correlate metadata of additional data 174 (a typical child's program) with keypress pressure data of sensor data 182 (less than a threshold) to determine that a classification of user 101 is indicative of a child, and thus, classify user 101 within a child demographic.

In some implementations, server computing system 160, and in particular, analytics computing engine 164, may determine a second video stream 172 based on classification of user 101. Specifically, analytics computing engine 164 identifies second video stream 172 that is associated with a classification of user 101. For example, analytics computing engine 164 may access a data store (not shown) that may store associations between video streams and classifications of users. Continuing the example, analytics computing engine 164 has determined that a classification of user 101 to be within a child demographic. To that end, analytics computing engine 164 may determine second video stream 172 based on a child demographic of user 101. For example, analytics computing engine 164 may determine second video stream 172 to include a different child's program, or an advertisement for child products.

In some examples, analytics computing engine 164 may determine second video stream 172 further based on pointers to external events of RCDR 180. For example, analytics computing engine 164 may provide, or determine, second video stream 172 based on a classification of user 101, and further based on external events indicated by RCDR 180. Continuing, an external event that is indicated by RCDR 180 may include a particular holiday. To that end, analytics computing engine 164 may determine second video stream 172 based on a child demographic of user 101, and an external event of a holiday. For example, analytics computing engine 164 may determine second video stream 172 to include a different child's program based on holiday, or an advertisement for child products based on a holiday.

In some examples, analytics computing engine 164 may determine second video stream 172 based on a particular user. Specifically, as mentioned above, analytics computing engine 164 may determine a particular user of a set of users that is associated with sensor data 182. Continuing the example, analytics computing engine 164 determines that user 101 is Joey Smith. Analytics computing engine 164 may determine second video stream 172 based on user 101 being Joey Smith. For example, analytics computing engine 164 may access a user profile that is associated with user 101. The user profile may be stored by set-top box 120 and/or a data store (not shown) and provided to analytics computing engine 164. The user profile may store information of user 101, such as demographic information, location of user, etc. The user profile may further store such information as identifying data of historical video streams associated with user 101 (e.g., video streams that have been provided by set-top box 120 previously) and interactions by user 101 with remote control device 150 when such video streams were provided.

To that end, analytics computing engine 164 may determine second video stream 172 based on user profile associated with user 101. For example, based on historical context of previous video streams provided by set-top box 120 to user 101, analytics computing engine 164 may determine second video stream 172. In some examples, analytics computing engine 164 may employ machine learning (e.g., neural networks) to determine second video stream 172. For example, analytics computing engine 164 may employ machine learning to determine second video stream 172 using information of a user profile as training data (e.g., historical video streams and user interactions with such) to determine second video stream 172.

In some implementations, server computing system 160, and in particular, analytics computing engine 164, may communicate second video stream 172 to set-top box 120. Specifically, analytics computing engine 164 may communicate second video stream 172 to set-top box 120 over network 140. Second video stream 172 may be displayed after conclusion of communicating first video stream 170. Analytics computing engine 164 may also communicate second video stream 172 concurrently with providing first video stream 170.

In some examples, analytics computing engine 164 may receive a second RCDR. Specifically, after communicating second video stream 172 to set-top box 120, analytics computing engine 164 may receive a second RCDR. Once second video stream 172 is established, remote control device 150 may initiate generation of the second RCDR—that is, initiate collection of sensor data from sensors 154 of remote control device 150. In other words, remote control device 150 generates the second RCDR in response to second video stream 172 that is provided by set-top box 120. The second RCDR may include sensor data that is collected by sensors 154 of remote control device 150. Specifically, sensors 154 may collect sensor data of remote control device 150 and/or user 101 that is interacting with remote control device 150, similar to sensor data 182. In some examples, sensor data of the second RCDR is responsive to second video stream 172. That is, sensor data of second RCDR is obtained during, or shortly after, presentation of second video stream 172, and may include data based on interactions by user 101 that is responsive to second video stream 172.

In some examples, analytics computing engine 164 may receive additional data from set-top box 120 that corresponds to the second RCDR that is indicative of second video stream 172, similar to additional data 174. For example, such additional data that corresponds to the second RCDR may include volume level data of second video stream 172 (e.g., a volume, or a range of volumes, at which second video stream 172 is provided by set-top box 120); and metadata of second video stream 172 (e.g., a channel, program, or video stream identifying data associated with second video stream 172).

In some examples, server computing system 160, and in particular, analytics computing engine 164, processes the second RCDR to determine an engagement by user 101 with second video stream 172. That is, analytics computing engine 164 processes the second RCDR to determine an engagement by user 101 with remote control device 150 and/or set-top box 120. For example, such engagements may include interactions by user 101 with remote control device 150 (e.g., detecting sensor data by remote control device 150); and a time of display of second video stream 172 by set-top box 120. For example, engagement by user 101 with second video stream 172 may be based on how long second video stream 172 is provided by set-to box 120 prior to sensing of interaction by user 101 with remote control device 150 (e.g., ceasing displaying of second video stream 172 in response to keypresses of remote control device 202 by user 101).

Analytics computing engine 164 may update a database record, or user profile, associated with user 101 indicating such engagement by user 101 with second video stream 172. For example, a user profile may be updated to indicate second video stream 172 and engagement with second video stream 172, such as a display time length of second video stream 172.

In some examples, interactions/engagements by user 101 with remote control device 150 via RCDRs associated with video streams 170, 172 may be used by analytics computing engine 164 as inputs for machine learning by analytics computing engine 164. For example, analytics computing engine 164 may process engagements by user 101 via RCDRs for video streams 170, 172 and adjust a recommendation for additional video streams to be communicated by analytics computing engine 164 to set-top box 120.

In some implementations, analytics computing engine 164 may communicate, in response to processing first RCDR 180, instructions to at least one of set-top box 120 and remote control device 150 to collect a subset of sensor data 182. Specifically, to reduce processing load by analytics computing engine 164, and/or to provide more efficient processing by analytics computing engine 164, analytics computing engine 164 may identify a subset of sensor data 182 that is to be used for classification of user 101. Analytics computing engine 164 may identify a subset of sensor data 154 based on one or more parameters (such as parameters set by a content provider 130, and/or sensor data that is most indicative of classification of user 101).

Analytics computing engine 164, after communicating instructions to collect a subset of sensor data 154, receives a third RCDR that includes a subset of sensor data 182. That is, third RCDR may include a subset of sensor data 182 that is collected by sensors 154 of remote control device 150. For example, a subset of sensor data 182 may include a subset of keypress selection data, keypress pressure data, temperature, frequency of keypresses, and location data of remote control device 150.

In some examples, instructions communicated by analytics computing engine 164 to collect a subset of sensor data 182 may include a threshold value associated with a subset of sensor data 182. The subset of sensor data 182 of third RCDR may include data that is responsive to the threshold value. For example, the threshold value may relate to a frequency of keypresses. To that end, analytics computing engine 164 would receive sensor data relating to the frequency of keypresses when a frequency of keypresses is above the threshold value. For example, the frequency of keypresses may indicate a level of interest by user 101 with respective video streams, and thus, a threshold of frequency of keypresses may indicate a minimum interest level by user 101 with respective video streams.

In some examples, analytics computing engine 164 may filter first RCDR 180 to identify a subset of sensor data 182. Analytics computing engine 164 may filter first RCDR 180 based on parameters provided by content provider 130. For example, filtering may be based on a relevance estimation by analytics computing engine 164 of each datum of sensor data 182 with respect to the classification of user 101. Analytics computing engine 164 may process first RCDR 180 that has been filtered to identify the classification of user 101 that is associated with sensor data 182.

Although FIG. 1 illustrates a particular arrangement of environment 100, user 101, user device 110, STB 120, content provider 130, and network 140. Two or more of user device 110, STB 120, and content provider 130 may be physically or logically co-located with each other in whole or in part. Although FIG. 1 illustrates a particular number of user device 110, STB 120, content provider 130, and network 140, this disclosure contemplates any suitable number of user device 110, STB 120, content provider 130, and network 140. For example, environment 100 may include multiple user devices 110, STBs 120, and content providers 130.

FIG. 2 illustrates a flowchart depicting selected elements of an embodiment of a method 200 for a user classification using a remote control detail record. Method 200 may be performed by environment 100 and/or analytics computing engine 164 described herein with reference to FIG. 1. It is noted that certain operations described in method 200 may be optional or may be rearranged in different embodiments.

At step 202, analytics computing engine 164 receives a RCDR 180 of remote control device 150. In some examples, analytics computing engine 164 receives first RCDR 180 from remote control device 150. In some examples, analytics computing engine 164 receives first RCDR 180 from set-top box 120, e.g., set-top box 120 receives RCDR 180 from remote control device 150 and provides RCDR 180 to analytics computing engine 164 over network 140. RCDR 180 may include sensor data 182 that is collected by sensors 154 of remote control device 150. Specifically, sensors 154 may collect sensor data 182 of remote control device 150 and/or user 101 that is interacting with remote control device 150.

At step 204, analytics computing engine 164 processes first RCDR 180 to determine a classification of user 101 that is associated with sensor data 182. That is, analytics computing engine 164 processes first RCDR 180 to determine a classification of user 101 that is providing, or is the source of, sensor data 182. Specifically, analytics computing engine 164 processes first RCDR 180 to determine one or more demographic categories (classifications) of user 101.

At step 206, analytics computing engine 164 may determine a second video stream 172 based on a classification of user 101. Specifically, analytics computing engine 164 identifies second video stream 172 that is associated with a classification of user 101.

At step 208, analytics computing engine 164 may communicate second video stream 172 to set-top box 120. Specifically, analytics computing engine 164 may communicate second video stream 172 to set-top box 120 over network 140.

At step 210, analytics computing engine 164 may determine whether a second RCDR is received. Specifically, after communicating second video stream 172 to set-top box 120, analytics computing engine 164 may determine if a second RCDR is received.

At step 212, if analytic computing engine 164 determines that a second RCDR is received, analytics computing engine 164 processes the second RCDR to determine an engagement by user 101 with second video stream 172. That is, analytics computing engine 164 processes second RCDR to determine an engagement by user 101 with remote control device 150 and/or set-top box 120. Remote control device 150 may generate a second RCDR in response to second video stream 172 that is provided by set-top box 120. The second RCDR may include sensor data that is collected by sensors 154 of remote control device 150. Specifically, sensors 154 may collect sensor data of remote control device 150 and/or user 101 that is interacting with remote control device 150, similar to sensor data 182.

At step 214, analytics computing engine 164 may update a database record, or user profile, associated with user 101 indicating such engagement by user 101 with second video stream 172.

If analytic computing engine 164 determines that a second RCDR is not received, method 200 returns to step 210.

Modifications, additions, or omissions may be made to the steps of this embodiment. These steps may be performed in parallel or in any suitable order by any suitable component.

FIG. 3 shows an example computer system that may be used by the systems and methods described herein. For example, any of user device 110, set-top box 120, content provider 130, network 140, remote control device 150, and server computing system 160 of FIG. 1 may include one or more interface(s) 310, processing circuitry 320, memory(ies) 330, and/or other suitable element(s). The computer system of FIG. 3 may have artificial intelligence (AI) and/or machine learning (ML) capabilities.

Interface 310 receives input, sends output, processes the input and/or output, and/or performs other suitable operation. Interface 310 may comprise hardware and/or software.

Processing circuitry 320 performs or manages the operations of the component. Processing circuitry 320 may include hardware and/or software. Examples of a processing circuitry include one or more computers, one or more microprocessors, one or more applications, etc. In certain embodiments, processing circuitry 320 executes logic (e.g., instructions) to perform actions (e.g., operations), such as generating output from input. The logic executed by processing circuitry 320 may be encoded in one or more tangible, non-transitory computer readable media (such as memory 330). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 330 (or memory unit) stores information. Memory 330 may comprise one or more non-transitory, tangible, computer-readable, and/or computer-executable storage media. Examples of memory 330 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising:
    receiving, by an analytics computing engine, a first remote control detail record (RCDR) of a remote control device that is communicatively coupled to a set-top box, the first RCDR including sensor data from one or more sensors of the remote control device, the first RCDR being generated in response to a first video stream provided by the set-top box, the sensor data including at least a frequency of keypresses of the remote control device;
    processing, by the analytics computing engine, the first RCDR to determine a classification of a user associated with the sensor data, the classification of the user including one or more demographic categories;
    determining, by the analytics computing engine, a second video stream based on the classification of the user;
    identifying, by the analytics computing engine, i) a subset of the sensor data based on the classification of the user, including the frequency of keypresses of the remote control device and ii) a threshold value associated with the frequency of keypresses of the remote control device;
    communicating, by the analytics computing engine, i) the second video stream to the set-top box and ii) instructions to at least one of the set-top box and the remote control device to collect the subset of the sensor data, including the frequency of keypresses of the remote control device that is above the threshold value;
    after communicating the instructions, receiving, by the analytics computing engine, an additional RCDR of the remote control device, the additional RCDR being generated in response to the second video stream provided by the set-top box, the additional RCDR including the subset of the sensor data, including the frequency of keypresses of the remote control device that is above the threshold value;
    processing, by the analytics computing engine, the second RCDR to determine a minimum interest level by the user with the second video stream based on the frequency of keypresses of the remote control device that is above the threshold value; and
    updating, by the analytics computing engine, a database record associated with the user based on the determined minimum interest level with the second video stream.

2. The computer-implemented method of claim 1, wherein the sensor data of the first RCDR includes one or more of keypress selection data, keypress pressure data, temperature, the frequency of keypresses, and location data of the remote control relative to the set-top box.

3. The computer-implemented method of claim 1, wherein processing the first RCDR further comprises:
    receiving data indicating a set of users associated with at least one of the set-top box and the remote control device;
    comparing the data indicating the set of users with the first RCDR; and
    in response to comparing the data indicating the set of users with the first RCDR, determining a particular user of the set of users.

4. The computer-implemented method of claim 3, wherein determining the second video stream further comprises determining the second video stream based on the particular user.

5. The computer-implemented method of claim 1, further comprising:
    receiving, by the analytics computing engine, a second RCDR, the second RCDR being generated in response to the second video stream being communicated by the set-top box;
    processing, by the analytics computing engine, the second RCDR to determine engagement by the user with the second video stream; and
    updating, by the analytics computing engine, a database record associated with the user indicating the engagement of the user with the second video stream.

6. The computer-implemented method of claim 1, further comprising:
    receiving, by the analytics computing engine, additional data from the set-top box that corresponds to the first RCDR, the additional data including data indicative of the first video stream; and
    processing, by the analytics computing engine, the first RCDR and the additional data to determine the classification of the user associated with the sensor data.

7. The computer-implemented method of claim 6, wherein the additional data includes one or more of a geographic location data of the set-top box, volume level data of the first video stream, metadata of the first video stream, and user profile data of the user associated with the sensor data.

8. The computer-implemented method of claim 1, wherein the analytics computing engine receives the first RCDR from at least one of the remote control device and the set-top box.

9. The computer-implemented method of claim 1, further comprising:
    filtering the first RCDR to identify a subset of the sensor data, the filtering based on one or more parameters of an entity providing the first and the second video streams; and
    processing the first RCDR that has been filtered to identify the classification of the user associated with the sensor data.

10. The computer-implemented method of claim 1, wherein the first video stream and the second video stream are provided concurrently.

11. A system comprising a processor having access to memory media storing instructions executable by the processor to perform operations:
    receiving, by an analytics computing engine, a first remote control detail record (RCDR) of a remote control device that is communicatively coupled to a set-top box, the first RCDR including sensor data from one or more sensors of the remote control device, the first RCDR being generated in response to a first video stream provided by the set-top box, the sensor data including at least a frequency of keypresses of the remote control device;

processing, by the analytics computing engine, the first RCDR to determine a classification of a user associated with the sensor data, the classification of the user including one or more demographic categories;

determining, by the analytics computing engine, a second video stream based on the classification of the user;

identifying, by the analytics computing engine, i) a subset of the sensor data based on the classification of the user, including the frequency of keypresses of the remote control device and ii) a threshold value associated with the frequency of keypresses of the remote control device;

communicating, by the analytics computing engine, i) the second video stream to the set-top box and ii) instructions to at least one of the set-top box and the remote control device to collect the subset of the sensor data, including the frequency of keypresses of the remote control device that is above the threshold value;

after communicating the instructions, receiving, by the analytics computing engine, an additional RCDR of the remote control device, the additional RCDR being generated in response to the second video stream provided by the set-top box, the additional RCDR including the subset of the sensor data, including the frequency of keypresses of the remote control device that is above the threshold value;

processing, by the analytics computing engine, the second RCDR to determine a minimum interest level by the user with the second video stream based on the frequency of keypresses of the remote control device that is above the threshold value; and updating, by the analytics computing engine, a database record associated with the user based on the determined minimum interest level with the second video stream.

12. The system of claim 11, wherein the sensor data of the first RCDR includes one or more of keypress selection data, keypress pressure data, temperature, the frequency of keypresses, and location data of the remote control relative to the set-top box.

13. The system of claim 11, wherein processing the first RCDR further comprises:
  receiving data indicating a set of users associated with at least one of the set-top box and the remote control device;
  comparing the data indicating the set of users with the first RCDR; and
  in response to comparing the data indicating the set of users with the first RCDR, determining a particular user of the set of users.

14. The system of claim 13, wherein determining the second video stream further comprises determining the second video stream based on the particular user.

15. The system of claim 11, the operations further comprising:
  receiving, by the analytics computing engine, a second RCDR, the second RCDR being generated in response to the second video stream being communicated by the set-top box;
  processing, by the analytics computing engine, the second RCDR to determine engagement by the user with the second video stream; and
  updating, by the analytics computing engine, a database record associated with the user indicating the engagement of the user with the second video stream.

16. The system of claim 11, the operations further comprising:
  receiving, by the analytics computing engine, additional data from the set-top box that corresponds to the first RCDR, the additional data including data indicative of the first video stream; and
  processing, by the analytics computing engine, the first RCDR and the additional data to determine the classification of the user associated with the sensor data.

17. The system of claim 16, wherein the additional data includes one or more of a geographic location data of the set-top box, volume level data of the first video stream, metadata of the first video stream, and user profile data of the user associated with the sensor data.

18. A non-transitory computer-readable medium storing software comprising instructions executable by one or more computers which, upon such execution, cause the one or more computers to perform operations comprising:
  receiving, by an analytics computing engine, a first remote control detail record (RCDR) of a remote control device that is communicatively coupled to a set-top box, the first RCDR including sensor data from one or more sensors of the remote control device, the first RCDR being generated in response to a first video stream provided by the set-top box, the sensor data including at least a frequency of keypresses of the remote control device;
  processing, by the analytics computing engine, the first RCDR to determine a classification of a user associated with the sensor data, the classification of the user including one or more demographic categories;
  determining, by the analytics computing engine, a second video stream based on the classification of the user;
  identifying, by the analytics computing engine, i) a subset of the sensor data based on the classification of the user, including the frequency of keypresses of the remote control device and ii) a threshold value associated with the frequency of keypresses of the remote control device;
  communicating, by the analytics computing engine, i) the second video stream to the set-top box and ii) instructions to at least one of the set-top box and the remote control device to collect the subset of the sensor data, including the frequency of keypresses of the remote control device that is above the threshold value;
  after communicating the instructions, receiving, by the analytics computing engine, an additional RCDR of the remote control device, the additional RCDR being generated in response to the second video stream provided by the set-top box, the additional RCDR including the subset of the sensor data, including the frequency of keypresses of the remote control device that is above the threshold value;
  processing, by the analytics computing engine, the second RCDR to determine a minimum interest level by the user with the second video stream based on the frequency of keypresses of the remote control device that is above the threshold value; and updating, by the analytics computing engine, a database record associated with the user based on the determined minimum interest level with the second video stream.

* * * * *